United States Patent
Bala

(10) Patent No.: US 6,798,876 B1
(45) Date of Patent: Sep. 28, 2004

(54) METHOD AND APPARATUS FOR INTELLIGENT ROUTING OF INCOMING CALLS TO REPRESENTATIVES IN A CALL CENTER

(75) Inventor: Srinivas Bala, Edison, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/473,951

(22) Filed: Dec. 29, 1999

Related U.S. Application Data

(60) Provisional application No. 60/114,033, filed on Dec. 29, 1998.

(51) Int. Cl.⁷ ............................................... H04M 3/00
(52) U.S. Cl. ............................ 379/265.12; 379/265.02; 379/265.13
(58) Field of Search ........................ 379/265.13, 266.02, 379/266.12

(56) References Cited

U.S. PATENT DOCUMENTS 6,389,400 B1 * 5/2002 Bushey et al. .................. 705/7

* cited by examiner

Primary Examiner—Ahmad F. Matar
Assistant Examiner—Karen Le

(57) ABSTRACT

A method and apparatus is disclosed for specifically routing a call based on the profile of the caller, the profile of the call center representative, and for updating the system based on experience to provide for more accurate call routing. The system accesses customer profile information and/or customer service representative information, and comparing the customer's need to the representative skill sets and job functions. It ranks the customer service representatives that can best meet the customer needs. The system then proceeds to route the incoming call to the service representative that is most likely to successfully meet the customer's needs. The system performs a post-call routine to determine how successfully it matched the customer with the appropriate call center representative.

20 Claims, 3 Drawing Sheets

METHOD AND APPARATUS FOR INTELLIGENT ROUTING OF INCOMING CALLS TO REPRESENTATIVES IN A CALL CENTER

This application hereby claims priority to U.S. Provisional Application No. 60/114,033 filed on Dec. 29, 1998.

FIELD OF THE INVENTION

The present invention is related to communications management systems and, more particularly, to a routing system for a call directed to a call center.

BACKGROUND OF THE INVENTION

Incoming telephone calls to a call center, e.g. to a customer service help center, are generally routed to the next available call center service representative in the following manner. A customer places a call to a customer service number. The call is switched through a PSTN to the customer premise equipment (CPE) of the customer service call center. An Automatic Call Distributor (ACD) routes the incoming calls to agent groups based on predetermined specifications. The Dialed Number Identification Service (DNIS) delivers the number dialed by the customer to the call center. This allows the call center to route the call based on the specific number dialed by the customer and also allows agents to identify the nature of the incoming call based on the number dialed. For example, separate numbers may be provided for new orders, existing orders, and returns.

Based on the number dialed, the ACD routes the call to the appropriate department. Interactive voice response units (VRUs) are used to allow callers to select certain preferences using their touch-tone phones or speech recognition to enable ACD to route the call to the appropriate departments. For example, "press or say one for toys," "press or say two for Bicycles," and "press or say three for sports equipment." This delivers the call to the agent responsible for those preferences. Additionally, Automatic Number Identification (ANI) is provided to call center representatives which allows customer data to be delivered from the database to the representative's desktop along with the call. The routing provided by ACD and the VRU utilizing data such as DNIS and ANI is often not adequate in identifying the customer's need and matching that need with the customer service representative most likely to satisfy that need. This technology simply routes calls to the first available agent by general work function and there is no proof (statistical or experimental) that such routing is related to customer satisfaction.

Accordingly, the prior art provides only generalized call routing capability. It is possible to route calls based on the ANI of the incoming call, by time of day, or by DNIS (the number dialed by the caller). A caller may use dual tone multiple frequency (DTMF) or voice technology to select a choice or preference that routes the call based on the selection. All of these methods assist in routing of a call from a customer with a specific need to a call center representative that has the means to satisfy that need.

SUMMARY OF THE INVENTION

The present invention discloses a method and apparatus for specifically routing a call based on the profile of the caller, the profile of the call center representative, and for updating the system based on experience to provide for more accurate call routing. The system accesses customer profile information and/or service customer representative profile and compares the customer's needs to the representative skill sets and job functions. It ranks the customer service representatives that can best meet the customer's needs. The system then proceeds to route the incoming call to the service representative that is most likely to successfully meet the customer's needs. The system performs a post-call routine to determine how successfully it matched the customer with the appropriate call center representative.

According to one embodiment of the invention, a method and apparatus for routing an incoming call to a customer service representative is disclosed. The caller of the incoming call is first identified and a profile on the caller is retrieved. The caller profile is then compared with stored customer service representative profiles to determine which customer service representatives are more qualified to handle the incoming call. The customer service representatives are ranked according to who can best meet the caller's needs, and the incoming call is routed to the highest ranked available customer service representative. If the highest ranked customer service representative is not available or can not handle the call, the call is routed to the next highest available customer service representative According to another embodiment of the invention, a method and apparatus for routing an incoming call to a customer service representative is disclosed. The caller of the incoming call is first identified and a profile on the caller is retrieved. The caller is then prompted with a list of questions. The caller profile and answers to the prompted questions are then compared with stored customer service representative profiles to determine which customer service representatives are more qualified to handle the incoming call. The customer service representatives are then ranked according to who can best meet the caller's needs, and the incoming call is routed to the highest ranked customer service representative.

BRIEF DESCRIPTION OF THE DRAWINGS

Further objects, features and advantages of the present invention will become apparent upon consideration of the detailed description of the presently preferred embodiments, when taken in conjunction with the accompanying drawings, wherein.

DETAILED DESCRIPTION

Figure 1:
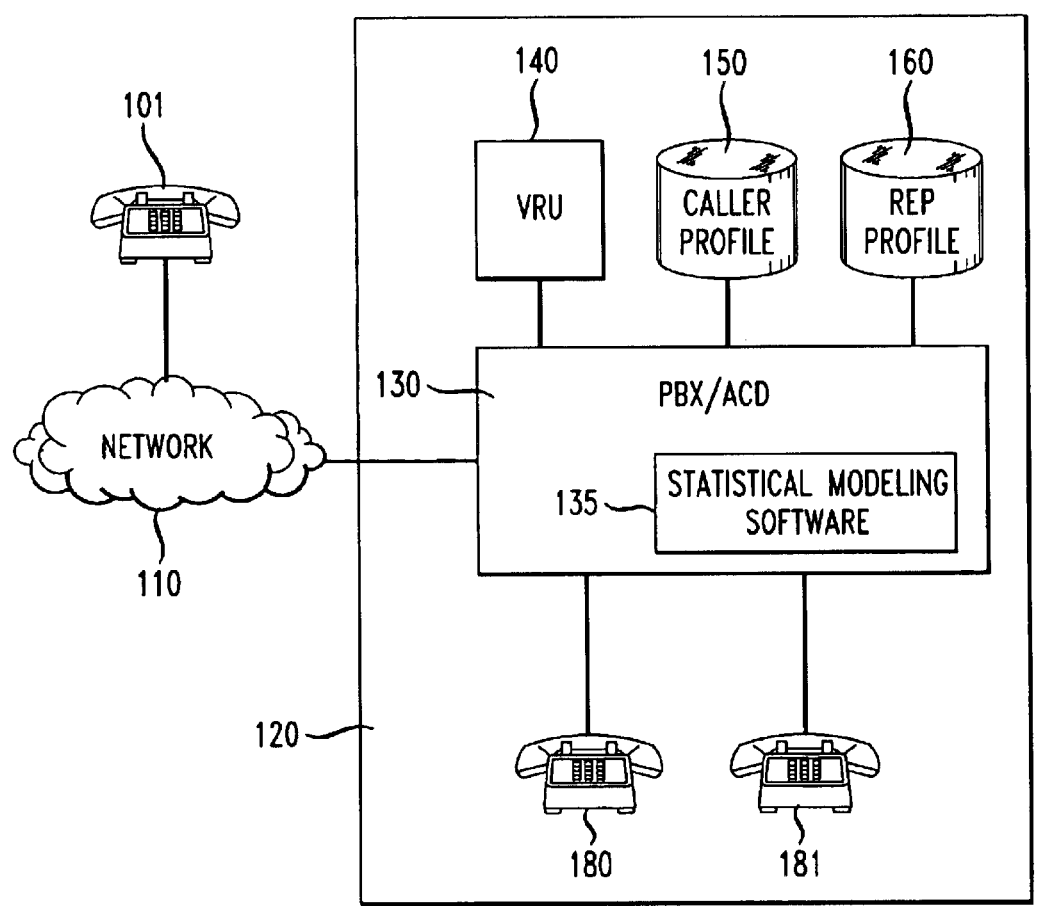
FIG. 1 is a schematic diagram of a communication system arranged in accordance with one embodiment of the present invention.

FIG. 1 is a schematic diagram of a communication system arranged in accordance with an embodiment of the present invention. With reference to FIG. 1, a caller at a telephone 101 places a call to a call center 120. The call is routed to the call center 120 through a communications carrier network 110, which may be a local exchange carrier (LEC) network, an interexchange carrier network, or a combination of the two. Communications carrier network 110 is comprised of telephone switching and signaling systems, which are interconnected by transmission lines and which are arranged to route calls to appropriate destinations.

The call is completed to a PBX/ACD 130 at the call center, which is a premises-based voice switching system designed to receive calls destined for the call center 120, route the call to the appropriate representative in accordance with the present invention, or queue them when a call cannot be completed to a particular chosen pool of representatives. The PBX/ACD 130 comprises a processor comprised of logic circuitry and software that allows the PBX/ACD 130 to route a call to a specific attendant position (e.g. 180, 181). A voice response unit (VRU) 140 is available which is capable of prompting the caller for specific information by asking questions based on a set of modules in a transaction script and collecting information by detecting and interpreting DTMF signals entered by the caller or by recognizing speech input from the caller.

The invention advances the functionality of the prior art in the following manner. The system maintains profiles for customers (from warranty card, point of sale information, or a customer database with purchase history) in database 150 and profiles for customer service representatives (based on their training and skill sets) in database 160. The system identifies the customer from their ANI or other means of identification (such as customer number entered using DTMF in response to a prompt from a VRU 140), accesses the customer's profile, and matches key customer information to the customer service representative profile. Note that the customer profile databases and the customer service representative profile databases are designed to store call summary statistics pertaining to the success/failure of the previous calls, average rate times before successful connects, etc.

The customer information may include, for example, data such as the customer's age, sex, native language, home address, profession, educational background, product purchased, past products purchased, length of time as a customer, number of calls made to customer service, average duration of those calls, number of complaints made, location where the product was purchased, DNIS, preferences selected in response to a VRU prompt, and other customer information but the invention is not limited thereto. Customer service representative data may include, for example, age, sex, educational background, ethnic background, foreign languages spoken, training courses completed, years experience (overall), years experience with the firm or company, years experience as a customer service representative, length of time in current position, degree of familiarity with each of the firm's products or services (for example, expert, advanced, intermediate, novice, none), and other information but the invention is not limited thereto. The different parameters can be assigned different priorities depending on the preferences of the person or company who implements this service.

The call distribution software includes a statistical modeling module 135 which performs a statistical analysis, using historical information for a correlation analysis or some other statistical method, to determine which customer service representative attributes when combined with certain customer attributes provide a high degree of correlation to customer satisfaction. The results of this analysis provide a high degree of correlation to customer satisfaction. The results of this analysis provide an algorithm that the system uses to rank customer service representatives for a projected ability to satisfy the incoming call received from a customer. The system routes the incoming call to the most highly ranked representative. If the representative is not available, the system routes the call to the representative with the next highest ranking. If all of the representatives with the statistically significant ranking are not available, then the system can route the call to a supervisor or other designated person.

Figure 2:
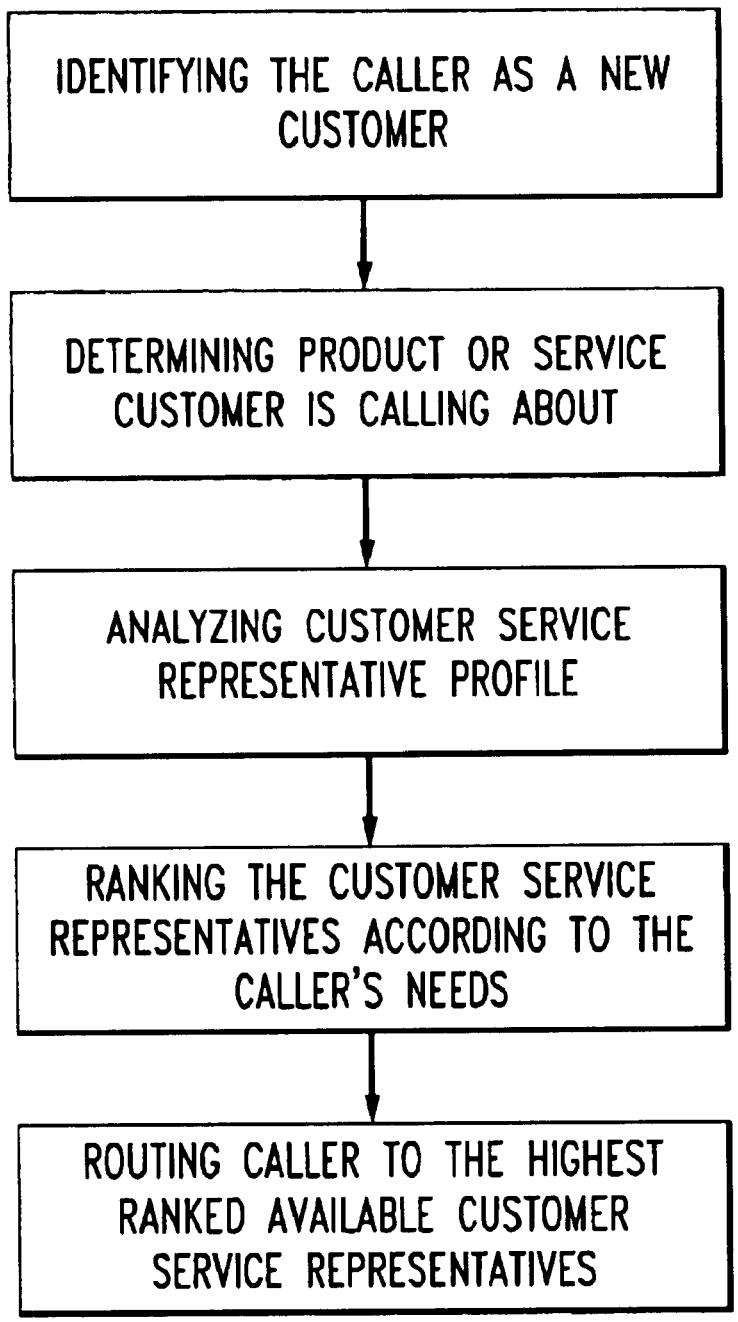
FIG. 2 is a flow chart illustrating the operation of one embodiment of the present invention.

Different statistical analysis may be performed for different types of customers, for example, new customers and repeat customers. As illustrated in FIG. 2, for new customers, the system must first determine what product or service the customer is calling about. This step can be performed by a live operator or an automated system by prompting the customer to identify the product or service. Once the product or service has been identified, the system then analyzes the customer representative profiles to determine which customer service representatives are qualified to handle the call. The system creates a list of qualified customer service representatives to whom the call can be transferred. For a new customer there are numerous factors that may be looked at to determine which customer service representatives are qualified to handle the call. For example, the customer service representatives can be ranked according to how many calls regarding the selected product or service the customer service representative has successfully handled in the past; how much specialization the customer service representative has with the selected service or product; the number of instances the customer service representative has handled a call that resulted in a sale, but the present invention is not limited thereto. The parameters can be prioritized or weighted in various manners depending in the particular preferences of the person or company implementing this system.

Figure 3:
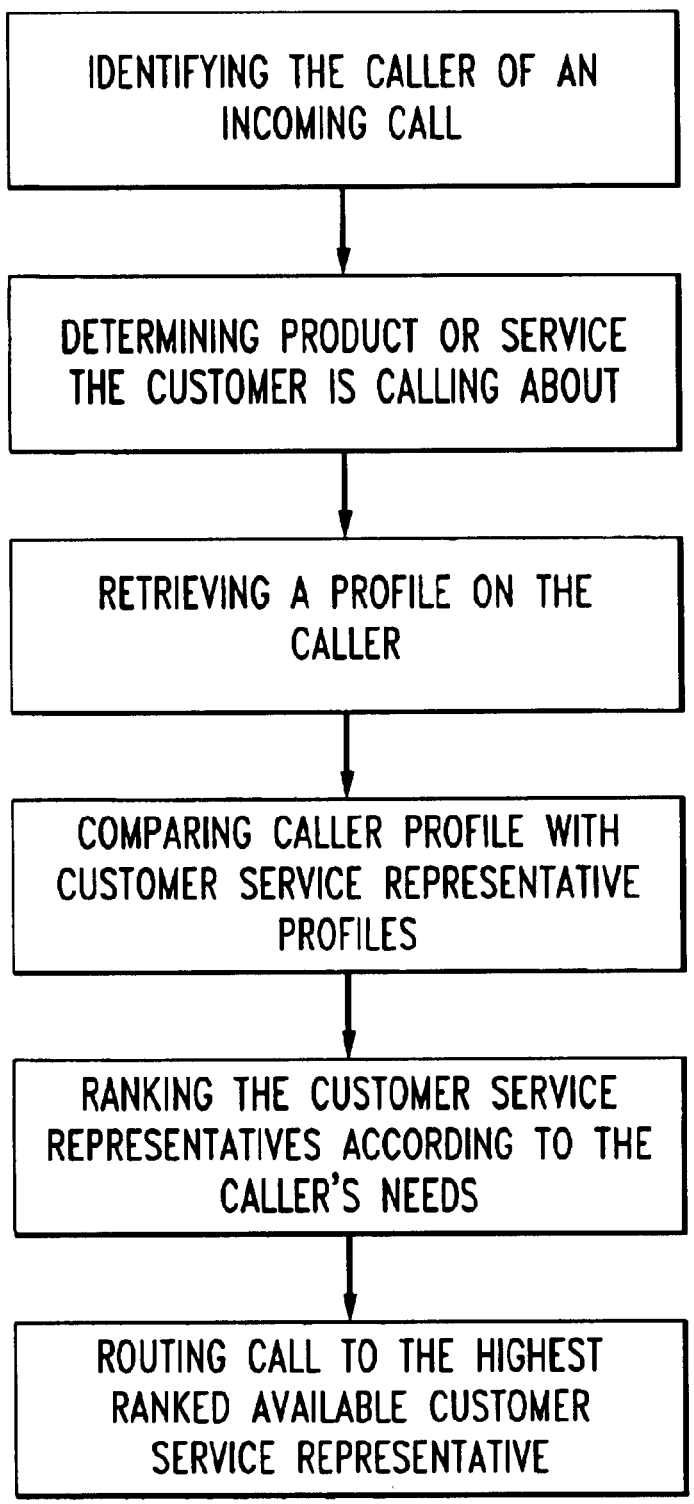
FIG. 3 is a flow chart illustrating the operation of one embodiment of the present invention.

As illustrated in FIG. 3, for existing customers, the system again must first determine what product or service the customer is interested in. This step can be performed by a live operator or an automated system by prompting the customer to identify the product or service. Alternatively, the system can analyze the customer's profile and make an assumption, based on past calls, as to what product or service the customer is calling about. For example, if the customer profile shows that customer A has called four times in the last year regarding service X, the system could assume that customer A is again calling about product X. In one embodiment of the invention, if the customer identifies a product or service or specifies a certain customer service representative, this information takes priority over the information in the customer's profile. Once the product or service has been identified, the system then analyzes data stored in the customer's profile regarding previous calls. For example, the system may look at what customer service representative the previous call(s) were originally connected to, how many transfers were needed to find the customer service representative who could successfully handle the call and what customer service representative successfully handled the call. Furthermore, there are numerous factors that may be looked at to determine which customer service representatives are qualified to handle the call. For example, the customer service representatives can be ranked according to how many calls regarding the selected product or service the customer service representative has successfully handled in the past; how much specialization the customer service representative has with the selected service or product; the number of instances the customer service representative has handled a call that resulted in a sale, but the present invention is not limited thereto. In addition, an another parameter can be the number of times a particular customer service representative has successfully helped the particular customer. The parameters can be prioritized or weighted in various manners depending in the particular preferences of the person or company implementing this system. All of this information is then used to create a list of customer service representatives who can best handle the call.

The system monitors the call data and determines if the call was successful or not successful. The system then updates the customer profile and the customer service representative profile, which, accordingly impacts the system algorithm for determining a routing choice. Additionally, a VRU 140 can prompt the customer service representative and customer for quality regarding the customer service call. That data is also updated in the profiles 150, 160 maintained by the system.

Additionally, a survey using a voice response unit could be performed after the completion of the call. The survey, to either or both the customer and call center representative, would capture data regarding the appropriateness of the routing of the call based on the customer's need to the right customer service representative.

Although a preferred embodiment of the method of the present invention has been illustrated in the accompanying drawings and described in the foregoing Detailed Description, it will be understood that the invention is not limited to the embodiment disclosed, but is capable of numerous rearrangements, modifications and substitutions without departing from the spirit of the invention as set forth and defined in the following claims.

We claim:

1. A method for routing an incoming call to a customer service representative comprising the steps of:
   identifying the caller of the incoming call;
   retrieving a profile on the caller;
   comparing the caller profile with stored customer service representative profiles to determine which customer service representatives are more qualified to handle the incoming call;
   ranking the customer service representatives that can best meet the caller's needs;
   routing the incoming call to a selected highest ranked customer service representative; and
   automatically updating, at the completion of the call, the caller profile and the selected customer service representative profile with information regarding the success of the call.

2. The method for routing an incoming call according to claim 1, further comprising the step of:
   routing the incoming call to the next highest ranked customer service representative if the previously selected customer service representative is unavailable.

3. The method for routing an incoming call according to claim 1, wherein said caller profile comprises at least one of the caller's age, gender, native language, home address, profession, educational background, product purchased, past products purchased, length of time as a customer, number of calls made to customer service, average duration of those calls, number of complaints made, location where the product was purchased, DNIS, preferences selected in response to a voice response unit, and other customer information.

4. The method for routing an incoming call according to claim 1, wherein said customer service representative profiles comprise at least one of age, gender, educational background, ethnic background, foreign languages spoken, training courses completed, years of experience, years of experience with company, years of experience as a customer service representative, length of time in current position, degree of familiarity with each of the company's products or services, and other information.

5. The method for routing an incoming call according to claim 1, further comprising the step of:
   conducting a post-call survey, during the updating step, of at least one of said caller and said customer service representative in order to determine the success of the call.

6. A method for routing an incoming call to a customer service representative, comprising the steps of:
   identifying the caller of the incoming call;
   retrieving a profile on the caller;
   prompting the caller with a list of questions;
   comparing the caller profile and answers to the prompted questions with stored customer service representative profiles to determine which customer service representatives are more qualified to handle the incoming call;
   ranking the customer service representatives that can best meet the caller's needs;
   routing the incoming call to the highest ranked customer service representative; and
   automatically updating, at the completion of the call, the caller profile and the highest ranked customer service representative profile with information regarding the success of the call.

7. The method for routing an incoming call according to claim 6, further comprising the step of:
   routing the incoming call to the next highest ranked customer service representative if the previously selected customer service representative is unavailable.

8. The method for routing an incoming call according to claim 6, wherein said caller profile comprises at least one of the caller's age, gender, native language, home address, profession, educational background, product purchased, past products purchased, length of time as a customer, number of calls made to customer service, average duration of those calls, number of complaints made, location where the product was purchased, DNIS, preferences selected in response to a voice response unit, and other customer information.

9. The method for routing an incoming call according to claim 6, wherein said customer service representative profiles comprise at least one of age, gender, educational background, ethnic background, foreign languages spoken, training courses completed, years of experience, years of experience with company, years of experience as a customer service representative, length of time in current position, degree of familiarity with each of the company's products or services, and other information.

10. The method for routing an incoming call according to claim 6, further comprising the step of:
    conducting a post-call survey, during the updating step, of at least one of said caller and said customer service representative in order to determine the success of the call.

11. A system for routing an incoming call to a customer service representative, comprising:
    means for identifying the caller of the incoming call;
    means for retrieving a profile on the caller;
    means for comparing the caller profile with stored customer service representative profiles to determine which customer service representatives are more qualified to handle the incoming call;
    means for ranking the customer service representatives that can best meet the caller's needs;
    means for routing the incoming call to the highest ranked customer service representative; and
    means for automatically updating the caller profile and the highest ranked customer service representative profile with information regarding the success of the call upon call completion.

12. The system for routing an incoming call according to claim 11, further comprising:

means for routing the incoming call to the next highest ranked customer service representative if the previously selected customer service representative is unavailable.

13. The system for routing an incoming call according to claim 11, wherein said caller profile comprises at least one of the caller's age, gender, native language, home address, profession, educational background, product purchased, past products purchased, length of time as a customer, number of calls made to customer service, average duration of those calls, number of complaints made, location where the product was purchased, DNIS, preferences selected in response to a voice response unit, and other customer information.

14. The system for routing an incoming call according to claim 11, wherein said customer service representative profiles comprise at least one of age, gender, educational background, ethnic background, foreign languages spoken, training courses completed, years of experience, years of experience with company, years of experience as a customer service representative, length of time in current position, degree of familiarity with each of the company's products or services, and other information.

15. The system for routing an incoming call according to claim 11 wherein the means for updating further comprises means for conducting a post-call survey of at least one of said caller and said customer service representative in order to determine the success of the call.

16. A system for routing an incoming call to a customer service representative, comprising:

means for identifying the caller of the incoming call;

means for retrieving a profile on the caller;

means for prompting the caller with a list of questions;

means for comparing the caller profile and answers to the prompted questions with stored customer service representative profiles to determine which customer service representatives are more qualified to handle the incoming call;

means for ranking the customer service representatives that can best meet the caller's needs;

means for routing the incoming call to the highest ranked customer service representative; and means for automatically updating the caller profile and the highest ranked customer service representative profile with information regarding the success of the call upon call completion.

17. The system for routing an incoming call according to claim 16, further comprising:

means for routing the incoming call to the next highest ranked customer service representative if the previously selected customer service representative is unavailable.

18. The system for routing an incoming call according to claim 16, wherein said caller profile comprises at least one of the caller's age, gender, native language, home address, profession, educational background, product purchased, past products purchased, length of time as a customer, number of calls made to customer service, average duration of those calls, number of complaints made, location where the product was purchased, DNIS, preferences selected in response to a voice response unit, and other customer information.

19. The system for routing an incoming call according to claim 16, wherein said customer service representative profiles comprise at least one of age, gender, educational background, ethnic background, foreign languages spoken, training courses completed, years of experience, years of experience with company, years of experience as a customer service representative, length of time in current position, degree of familiarity with each of the company's products or services, and other information.

20. The system for routing an incoming call according to claim 16, wherein the means for updating further comprises means for conducting a post-call survey of at least one of said caller and said customer service representative in order to determine the success of the call.

\* \* \* \* \*